US011960927B2

(12) United States Patent
Neithalath et al.

(10) Patent No.: US 11,960,927 B2
(45) Date of Patent: Apr. 16, 2024

(54) TASK CORRELATION FRAMEWORK

(71) Applicant: Dell Products L.P., Round Rock, TX (US)

(72) Inventors: Navin Kumar Neithalath, Bangalore (IN); Bijan Kumar Mohanty, Austin, TX (US); Damodaran Sivaraman, Bengaluru (IN); Nithiyanandham Tamilselvan, Salem (IN); Sampath Kumar Kalyana Sundaram, Kolar District (IN); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 461 days.

(21) Appl. No.: 17/373,184

(22) Filed: Jul. 12, 2021

(65) Prior Publication Data

US 2023/0008366 A1 Jan. 12, 2023

(51) Int. Cl.
*G06F 3/00* (2006.01)
*G06F 9/48* (2006.01)
*G06F 9/50* (2006.01)
*G06F 18/22* (2023.01)
*G06F 40/20* (2020.01)

(52) U.S. Cl.
CPC .......... *G06F 9/4881* (2013.01); *G06F 9/5038* (2013.01); *G06F 18/22* (2023.01); *G06F 40/20* (2020.01)

(58) Field of Classification Search
CPC ....................................................... G06F 9/455
See application file for complete search history.

(56) References Cited

U.S. PATENT DOCUMENTS

| | | | |
|---|---|---|---|
| 11,038,934 B1* | 6/2021 | Hansen | H04L 65/1069 |
| 2003/0221013 A1* | 11/2003 | Lockwood | H04L 41/08 |
| | | | 709/231 |
| 2011/0099052 A1* | 4/2011 | Brun | G06Q 10/06 |
| | | | 706/54 |
| 2017/0153965 A1* | 6/2017 | Nitta | G06F 9/455 |
| 2019/0147337 A1* | 5/2019 | Yang | G06N 3/08 |
| | | | 706/25 |

(Continued)

OTHER PUBLICATIONS

Detmar Meurers, Natural Language Processing and Language Learning. (Year: 2020).*

(Continued)

*Primary Examiner* — Lechi Truong
(74) *Attorney, Agent, or Firm* — Ryan, Mason & Lewis, LLP

(57) ABSTRACT

A method comprises extracting first task data from a first data source corresponding to a first application and second task data from a second data source corresponding to a second application, and comparing the first task data to the second task data using one or more natural language processing techniques. In the method, one or more matching tasks between the first task data and the second task data are identified based at least in part on the comparing. Code of at least one of the first application and the second application is analyzed to determine whether the code of at least one of the first application and the second application implements the one or more matching tasks.

20 Claims, 13 Drawing Sheets

(56) References Cited

U.S. PATENT DOCUMENTS

2020/0110687 A1\* 4/2020 Hu ...................... G06F 11/3013
2022/0237057 A1\* 7/2022 Ogrinz ................ G06F 11/3086

OTHER PUBLICATIONS

Franklin Covey Co., The 4 Disciplines of Execution, franklincovey.com/the-4-disciplines/#4Disciplines, Accessed Jun. 27, 2021, 10 pages.

Centriq Training, "What is Team Foundation Server (TFS)?" entriq.com/blog/category/corporate_it_training/microsoft/, Nov. 30, 2018, 5 pages.

\* cited by examiner

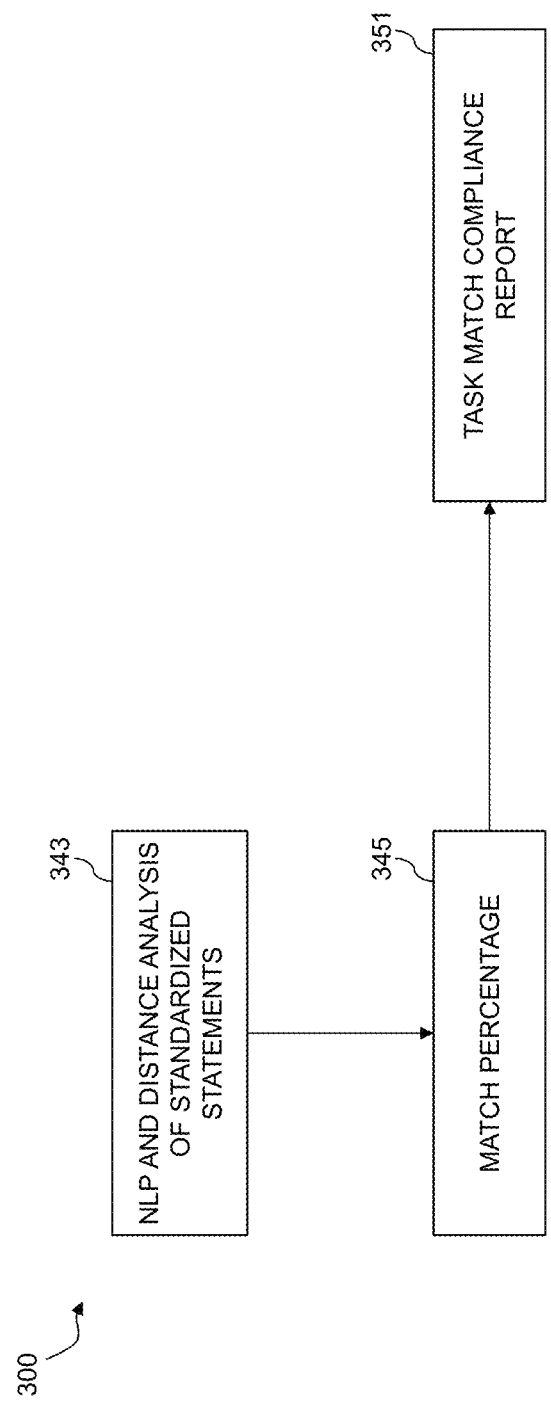

```
{
  "lead_measure": "security",
  "commitment": "I commit to work with the partners A, B and C
   to make them TLS 1.2 compliant by Oct 31st."
},
{
  "lead_measure": "devsecops",
  "commitment": "I commit to fix checkmarx high issues for cxl components
   targeted for BBQ"
},
{
  "lead_measure": "sdl_adoption",
  "commitment": "I commit to work with Security Consultant to get
   approval on the T&S and CC requests submitted for the ACH dashboard
   by 07/31"
}
```

```
[{
  "id": "123456",
  "assignedTo": "aithi",
  "state": "proposed",
  "iterationPath": "SP19-March23",
  "description": "I commit to fix checkmarx high issues for cxl components
   targeted for BBQ"
},
{
  "id": "123456",
  "assignedTo": "aithi",
  "state": "proposed",
  "iterationPath": "SP19-March23",
  "description": "I commit to work with the partners A, B and C to
   make them TLS 1.2 compliant by Oct 31st."
},
{
  "id": "123456",
  "assignedTo": "aithi",
  "state": "proposed",
  "iterationPath": "SP19-March23",
  "description": "I commit to work with Security Consultant to get approval
   on the T&S and CC requests submitted for the ACH dashboard by 07/31"
}]
```

```
"lead_measure": "security",
"commitment": "I commit to work with the partners A, B and C
to make them TLS 1.2 compliant by Oct 31st."
```
501

FIG. 5A

```
"id": "123456",
"assignedto": "nithi",
"state": "Proposed",
"iterationPath": "SP10-March23",
"description": "I commit to work with the partners A, B and C
to make them TLS 1.2 compliant by Oct 31st."
```
502

FIG. 5B

TASK CORRELATION FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to a framework for correlation of tasks.

BACKGROUND

Currently, users and computing systems of an enterprise exhaust considerable effort and resources to analyze and manage multiple datasets, tasks and/or schedules. For example, when adopting methods to execute enterprise goals, there can be considerable manual effort and/or inefficient use of computing resources when attempting to document and update commitments, and their status.

In addition, current solutions fail to analyze and interpret tasks from disparate sources. Accordingly, there is a need for a solution that addresses the issues with conventional approaches and uses computing and other resources more efficiently in connection with the analysis and management of tasks.

SUMMARY

Illustrative embodiments provide techniques to correlate tasks from different sources.

In one embodiment, a method comprises extracting first task data from a first data source corresponding to a first application and second task data from a second data source corresponding to a second application, and comparing the first task data to the second task data using one or more natural language processing techniques. In the method, one or more matching tasks between the first task data and the second task data are identified based at least in part on the comparing. Code of at least one of the first application and the second application is analyzed to determine whether the code of at least one of the first application and the second application implements the one or more matching tasks.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts details of an operational flow for determining matching tasks using natural language processing (NLP) according to an illustrative embodiment.

FIG. 4A depicts standardized task data corresponding to a first task data source according to an illustrative embodiment.

FIG. 4B depicts standardized task data corresponding to a second task data source according to an illustrative embodiment.

FIG. 5A depicts intersecting tasks of a first task data source according to an illustrative embodiment.

FIG. 5B depicts intersecting tasks of a second task data source according to an illustrative embodiment.

DETAILED DESCRIPTION

Figure 1:
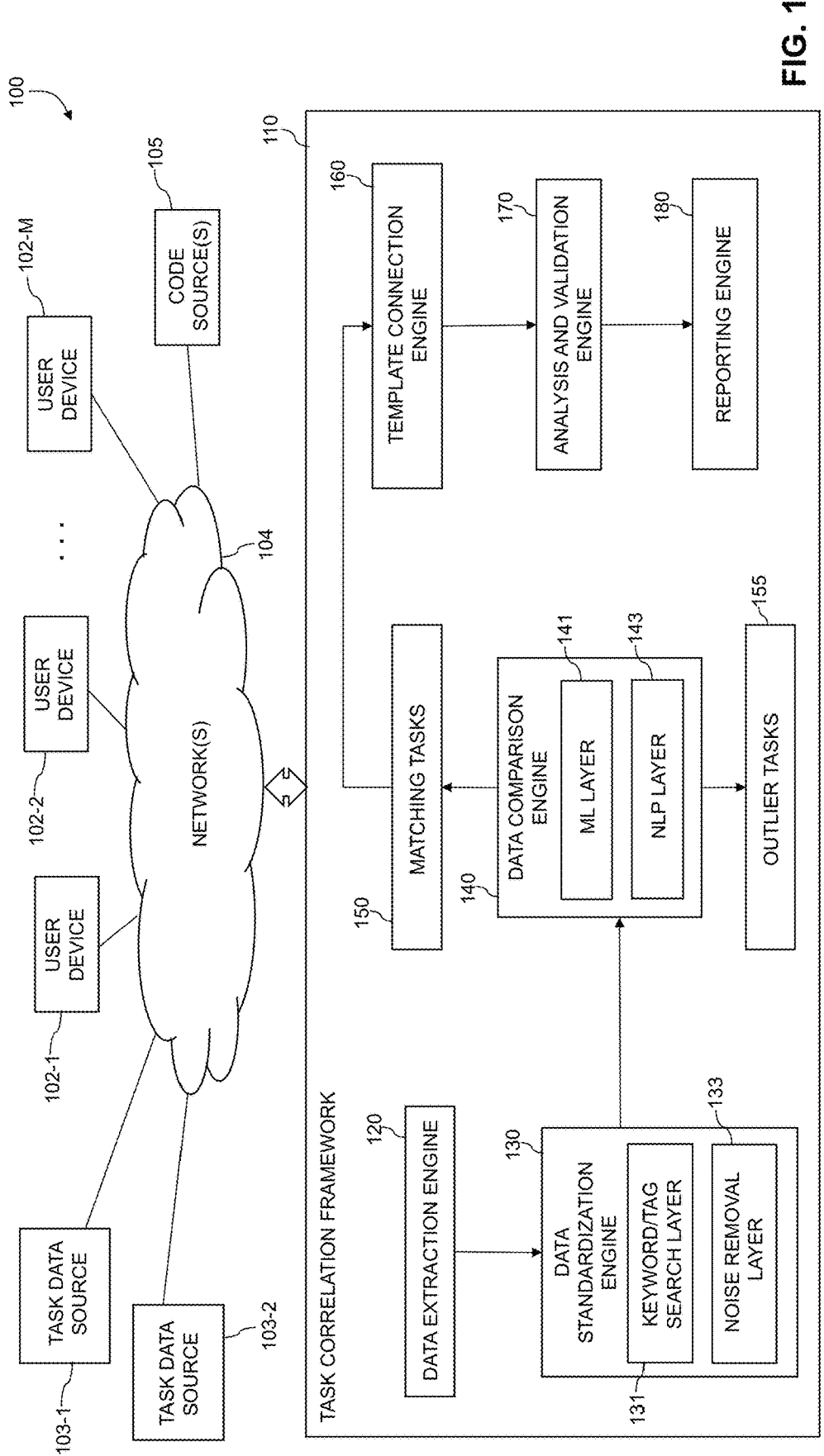
FIG. 1 depicts details of an information processing system with a task correlation framework for analyzing tasks from different sources and determining matching tasks according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

As used herein, "natural language understanding (NLU)" is to be broadly construed to refer to a sub-category of natural language processing in artificial intelligence (AI) where natural language input is disassembled and parsed to determine appropriate syntactic and semantic schemes in order to comprehend and use languages. NLU may rely on computational models that draw from linguistics to understand how language works, and comprehend what is being said by a user.

In an illustrative embodiment, machine learning (ML) techniques are used to examine any two or more sets or schedules of tasks (also referred to herein as "work items"), conduct tag or keyword-based searches, and determine intersecting tasks. Advantageously, the embodiments analyze and report tasks that exist in one set or schedule but are not present in the second set of tasks, and vice versa. The embodiments also process subset tasks, perform subset to whole comparisons, and create subsets based on provided filters. In one or more embodiments specific actions are taken after analysis and task completion reports are generated and transmitted to users. The reports are prepared in a convenient and consumable format setting forth the results of the analysis (e.g., common tasks between data sets or subsets of data sets and missing tasks between data sets or subsets of data sets). The embodiments further formulate new tasks that need to be presented in pre-defined formats by paraphrasing the new tasks using natural language processing (NLP) and/or natural language understanding (NLU) algorithms.

FIG. 1 shows an information processing system 100 configured in accordance with an illustrative embodiment. The information processing system 100 comprises user devices 102-1, 102-2, . . . 102-M (collectively "user devices 102"), task data sources 103-1 and 103-2 (collectively "task data sources 103") and one or more code sources 105. The user devices 102, task data sources 103 and code source(s) 105 communicate over a network 104 with each other and with a task correlation framework 110. The variable M and other similar index variables herein such as K and L are assumed to be arbitrary positive integers greater than or equal to two.

The user devices 102 can comprise, for example, Internet of Things (IoT) devices, desktop, laptop or tablet computers, mobile telephones, landline telephones or other types of processing devices capable of communicating with the task correlation framework 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise.

The task data sources 103 correspond to different applications and comprise, for example, databases or other type of data storage devices. The different applications respectively correspond to different platforms. For example, in an embodiment, a first task data source 103-1 corresponds to one or more applications for a first platform and the second task data source 103-2 corresponds to one or more applications for a second platform.

In a non-limiting operational example, the first and second platforms correspond to productivity platforms such as, for example, a 4 Disciplines of Execution (4DX) platform and Microsoft Team Foundation Server (TFS) platforms. In the case of a first and second task data sources 103-1 and 103-2 corresponding to 4DX and TFS platforms, respectively, the embodiments intelligently collate work items (tasks) from the TFS platform and reconcile them with work items (tasks) related to commitments provided for the 4DX platform. This ensures that no 4DX commitments are missed and further simultaneously ensures that tasks on the TFS platform are appropriately and expectedly documented.

In another non-limiting operational example, the first task data source 103-1 includes guidelines prescribed by security governance policies. For example, the first task data source 103-1 may correspond to one or more applications that compile or maintain such guidelines or other compliance applications. The second task data source 103-2 may correspond to one or more applications for managing work schedules including tasks associated with the implementation of the security governance policies. In this operational example, the embodiments intelligently collate tasks implemented in adherence to the security governance policies. A data set from the first task data source 103-1 may include, for example, details of guidelines prescribed by security governance policies and a data set from the second task data source 103-2 may include, for example, work schedules including the tasks associated with implementation of the security governance policies. For adoption of security policies in information technology (IT) for example, the embodiments may be utilized to correlate tasks between a security platform such as, for example, Kenna and a database platform such as, for example, a configuration management database (CMDB) platform.

In another non-limiting operational example, the first task data source 103-1 corresponds to a resource management platform, such as, for example CPT Tools, and the second task data source 103-2 corresponds to a productivity platform like 4DX or TFS. In this operational example, the embodiments intelligently collate tasks from program intake requirements with stories from an execution data set (e.g., TFS or other data stores). This will prevent enterprise outcomes from being left over or missed from an execution plan. In this operational example, the embodiments can analyze resource usage through a given time period (e.g., financial year) in, for example, TFS and correlate the usage with projects generated in the CPT tool during planning activities when the time period began and call out discrepancies in resource usage with respect to the estimates.

Although some operational examples are discussed herein, the embodiments are not limited thereto and may be applied to different combinations of task data sources 103 associated with different subjects, applications and/or platforms. In addition, although two task data sources 103 are shown in FIG. 1, the embodiments are not necessarily limited thereto, and more or less task data sources can be part of the information processing system 100.

The code source(s) 105 comprise, for example, code repositories including one or more templates. As used herein, a "template" is to be broadly construed to refer to, for example, a collection of one or more reusable code modules that have been created to adhere to relevant and required coding practices. Templates are modules that programmers may reuse and are designed to be regularly updated to align with all the latest coding, security and other relevant standards. According to an embodiment, a template is designed to be used as an add-on object (e.g., "plug and play" object). Various templates are designed for different use cases. For example, some templates that may be used in connection with the embodiments include, but are not necessarily limited to, configuration, code and/or quality templates. A non-limiting example of a code repository comprises a GitLab ("Git") repository.

As used herein, the terms "task" or "work item" are to be broadly construed to refer to, for example, any jobs or undertakings performed by an enterprise or other organization on behalf of the enterprise, a customer, a patron or other user. Tasks and/or work items can include, but are not necessarily limited to, compliance activities, security activities, development activities, operations activities, repairs, maintenance activities, approval requests, support and/or service activities, installations, deployments, configuration services, technical support items, human resources support items and/or any other enterprise undertakings. Although some examples herein are discussed in terms of security scenarios and related tasks, the embodiments are not limited thereto and may be applied to different scenarios and or tasks on behalf of an enterprise, a customer, a patron or other user.

The terms "client," "customer" or "user" herein are intended to be broadly construed so as to encompass numerous arrangements of human, hardware, software or firmware entities, as well as combinations of such entities. Intelligent conversation services may be provided for users utilizing one or more machine learning models, although it is to be appreciated that other types of infrastructure arrangements could be used. At least a portion of the available services and functionalities provided by the task correlation framework 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the task correlation framework 110, as well as to support communication between the task correlation framework 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the task correlation framework 110.

The task correlation framework 110 in the present embodiment is assumed to be accessible to the user devices 102, task data sources 103 and code source(s) 105 and vice-versa, over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The task correlation framework 110, on behalf of respective infrastructure tenants each corresponding to one or more users associated with respective ones of the user devices 102, provides a platform for analyzing tasks from different sources and determining matching tasks.

Referring to FIG. 1, the task correlation framework 110 comprises a data extraction engine 120, a data standardization engine 130, a data comparison engine 140, a template connection engine 160, an analysis and validation engine 170 and a reporting engine 180. The data standardization engine 130 includes a keyword/tag search layer 131 and a noise removal layer 133. The data comparison engine 140 includes a machine learning (ML) layer 141 and a natural language processing (NLP) layer 143. The data comparison engine 140 outputs matching tasks 150 and outlier tasks 155. The task correlation framework 110 intelligently interprets and formulates sets of tasks from disparate sources (e.g., task data sources 103-1 and 103-2). For example, the task correlation framework 110 uses predictive analytics to measure and recommend optimizations to improve productivity by comparing work item datasets. The task correlation framework 110 can identify incorrect estimates for a particular product or program in a given time period and recommend corrections for a following time period.

In keeping with the operational example based on 4DX and TFS platforms, 4DX techniques may be used by an enterprise across many teams. Applications or other software executing the 4DX model require users (e.g., team members) to declare commitments on their actions for each of their statements of work (referred to as "Wildly Important Goals"). To achieve their goals, users document their commitment statements in specific formats, which requires recording of these commitments in an intermediate document storage and into a 4DX application or other software. Similarly, TFS provides a platform designed to assist users with collaboration and orchestrating their efforts to complete projects or create products. It enables software development and IT operations (DevOps) capabilities covering application lifecycles. TFS may be used for tasks such as, but not necessarily limited to, source code management, requirements management, project management, reporting, testing, and release management.

According to an embodiment, the task correlation framework 110 tracks tasks associated with differently configured platforms to find matching and outlier tasks 150 and 155. For example, the task correlation framework 110 is configured to track stories in the TFS applications (from task data source 103-1) with or without corresponding commitment statements in 4DX applications (from task data source 103-2) or from other equivalent software or tools. The task correlation framework 110 is also configured to track commitments in 4DX applications (from task data source 103-2) with or without corresponding stories in TFS applications (from task data source 103-1) or other equivalent software or tools.

Figure 2:
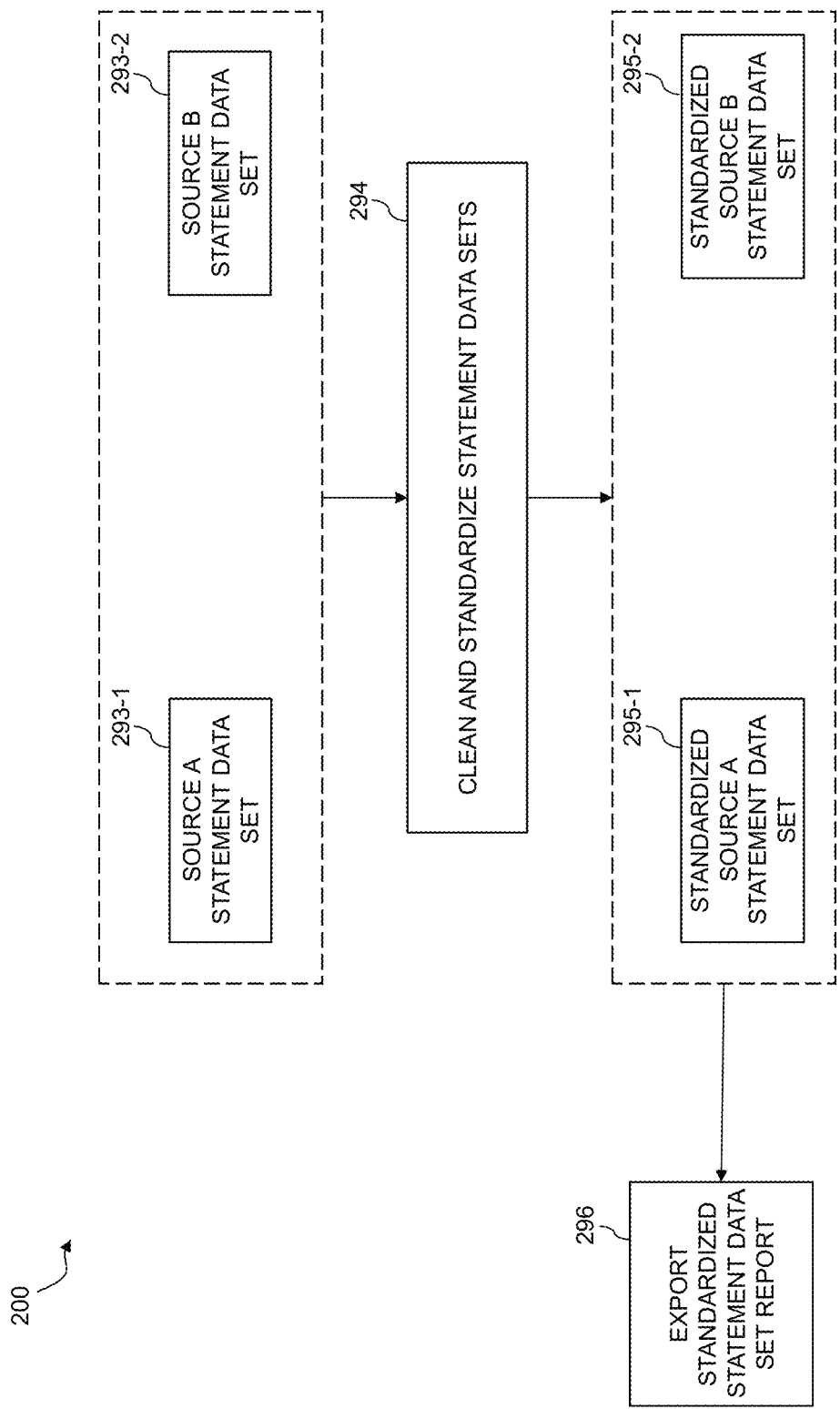
FIG. 2 depicts details of an operational flow for task extraction and standardization according to an illustrative embodiment.

In more detail, referring to the data extraction and data standardization engines 120 and 130 in FIG. 1 and to the operational flow 200 in FIG. 2, a first flow from source A statement data set 293-1 reads statements from a first task data set (e.g., from task data source 103-1) and, at block 294, cleanses and standardizes the retrieved data to result in standardized source A statement data set 295-1. Similarly, a second flow from source B statement data set 293-2 reads statements from a second task data set (e.g., from task data source 103-2) and, at block 294, cleanses and standardizes the retrieved data to result in standardized source B statement data set 295-2.

The data extraction engine 120 extracts from task data source 103-1 and task data source 103-2, the data sets that are required to be analyzed. Extraction of data transpires through, for example, application programming interface (API) calls, relational database management system (RDBMS) queries, screen scraping or other extraction mechanisms. The task data sources 103-1 and 103-2 can comprise a readable repository (e.g., TFS or 4DX server). The work item data can be retrieved as a whole, or a subset of a primary list based on the filter conditions. Filter conditions may comprise, for example, time slice filtering and other conditions that may define the scope of the work items in question.

In keeping with the operational example based on the 4DX and TFS platforms, a developer may commit to make changes to code to eliminate security vulnerabilities related to Transport Layer Security (TLS) 1.0 and 1.1. To do this, the developer would make a commitment in a 4DX application and create a TFS story pertaining to generating TLS 1.2 code and configurations for a particular application (e.g., XYZ application). The task correlation framework 110 permits tracking of the commitment(s) and auditing the changes by comparison of the 4DX and TFS tasks to provide reports on completion or gaps in connection with achieving the end result of eliminating the security vulnerabilities.

Information that may be extracted by the data extraction engine 120 comprises, for example, commitments for a given user (e.g., in 4DX), and user stories for a given user based on area paths (e.g., in TFS) to narrow down the data based on, for example, date and time criteria. Following data extraction, untreated data from the data sets that needs to be correlated is made available for further processing.

Referring to block 294 and to the data standardization engine 130, standardized statements are created based on pattern identification and/or configured rules. For example, although the data from the data extraction engine may contain necessary details for correlation, depending on the type and scope of correlation, it is possible that only a subset of the data is relevant for correlation processing. The data standardization engine 130 allows users to focus on data for their immediate requirements, providing them the capability to filter out any data that is not pertinent to their current correlation execution. For example, via the keyword/tag search layer and a user interface on the user devices 102, users can search and extract data based on defined keywords and/or metadata tags. Non-limiting examples of keywords include, for example, "Security," "DevOps," and "Security Development Lifecycle (SDL) Adoption". The noise removal layer 133 removes noise, which may comprise, for example, unrelated lead measures and unrelated user stories, which are not in the context of the comparison. In the context of the operational example, such unrelated lead measures and/or user stories may correspond to support or knowledge transfer (KT) tasks. The output of the data standardization engine 130 comprises a set of refined datasets (standardized source A and B statement data sets 295-1 and 295-2) that closely correspond to the correlation activity. FIG. 4A depicts standardized task data 401 corresponding to a first task data source (e.g., 4DX commitments data set). FIG. 4B depicts standardized task data 402 corresponding to a second task data source (e.g., TFS stories data set).

The standardization provides for effective and more accurate comparison as work items from the task data sources 103-1 and 103-2 are often in different formats. Data that is extracted and standardized is routed to the data comparison engine 140, where the comparison of tasks (work items) takes place. In addition, the standardized statements could also be exported into a standardized statement data set report, which can be exported to one or more users devices 102 (block 296).

Referring to the data comparison engine 140 in FIG. 1 and to the operational flow 300 in FIG. 3, the ML and NLP layers 141 and 143 compare the standardized task data from the task data sources 103-1 and 103-2 using one or more NLP and/or NLU techniques, and identify one or more matching tasks between the task data from a first task data source 103-1 and the task data from a second task data source 103-2 based at least in part on the comparing. The one or more matching tasks are identified by computing a distance between at least two sets of textual data respectively corresponding to the task data from the first task data source 103-1 and the second task data source 103-2. The computing is performed using a distance algorithm, such as for example, a Levenshtein and/or a Taro-Winkler distance algorithm.

The Levenshtein distance algorithm is an NLP mechanism for topic matching based on similarity between two sets of textual data. This algorithm computes the distance between two sets, with a higher value meaning the sets are more different. A distance value of 0 indicates the source and target sets are the same. In Levenshtein distance, the distance value describes the minimal number of deletions, insertions, or substitutions that are required to transform one string (the source) into another (the target). Unlike the other distance algorithms, the Levenshtein distance works on strings with an unequal length. According to an embodiment, the distance algorithm compares strings letter by letter, column-wise and row-wise in a matrix operation.

The output from the operational flow 200 in FIG. 2 is used as an input for the process 300 in FIG. 3. In more detail, according to an embodiment, referring to block 343, the standardized source A and B statement data sets 295-1 and 295-2 are compared using NLP and/or NLU and distance algorithm techniques and at block 345, a match percentage between tasks is determined, which is an indication of the match success. A threshold can be defined, which is used to determine if the standardized source A and source B statement data sets 295-1 and 295-2 match. For example, if a match percentage based at least in part on the distance algorithm is above a certain threshold, a match is concluded. Based on match percent, tasks are marked as compliant or not compliant.

The two sets of tasks are correlated for matches through the process 300 to output matching tasks 150, and the results can be viewed in a visual task match compliance report 351 that provides a view the number or volume of tasks that match with each other and/or which tasks match with each other. The intersecting items from the standardized source A and B statement data sets 295-1 and 295-2 are identified as the matching tasks 150. In addition, the data comparison engine 140 identifies one or more outlier tasks 155 based at least in part on the comparing. The one or more outlier tasks 155 are tasks in a given data set (e.g., A or B data set) which have been determined to lack a matching task in the remaining data set. For example, a task from a first task data source 103-1 that does not have a matching task from the second task data source 103-2 and vice versa is deemed to be an outlier task. An outliers report may be transmitted to a user device 102 so that a user can identify if action items need to be carried out for work items that do not have a matching work item in the other data set that is subject to comparison.

According to an embodiment, the comparison between the standardized source A and source B statement data sets 295-1 and 295-2 is performed based on user requirements set forth by, for example, the keyword and tag parameters or other content-based filtering rules inputted by a user and utilized by the data standardization engine 130 to filter the extracted source A and source B statement data sets 293-1 and 293-2 to remove data which may be irrelevant to the comparison. The comparison engine 140 analyzes the standardized source A and source B statement data sets 295-1 and 295-2 to determine common or intersecting data items. In the operational example, the work set data from 4DX is correlated with stories from TFS to identify the extent of coverage of 4DX commitments in the TFS backlog. When compared with the standardized task data 401 and 402 in FIGS. 4A and 4B, FIGS. 5A and 5B depict data items 501 (e.g., 4DX commitments) of a first task data source (e.g., 103-1) matching with data items 502 (e.g., TFS stories) of a second task data source (e.g., 103-2) and vice versa. For example, the data items 501 recite "commitment": "I commit to work with the partners A, B and C to make them TLS 1.2 compliant by Oct 31$^{st}$," and the matching data items 502 recite "description": "I commit to work with the partners A, B and C to make them TLS 1.2 compliant by Oct 31$^{st}$."

Referring back to FIG. 1, the template connection engine 160 extracts code of an application corresponding to the task data source 103-1 and/or of an application corresponding to the task data source 103-2. The code is pulled from one or more code sources 105, such as, for example a code repository. In the operational example, the code repository may be a git repository pertaining to MQ TLS 1.2 enablement. For example, the template connection engine 160 would pull a security code template from GitLab pertaining to the MQ TLS 1.2 enablement for XYZ application.

The analysis and validation engine 170 analyzes the extracted code to determine whether the code implements the one or more matching tasks by applying the retrieved template and analyzing a result of the applying of the retrieved template. As a result, a validation is performed by the analysis and validation engine 170 to determine if matching tasks 150 have been implemented in the relevant code module of the application and/or the platform in question (e.g., 4DX or TFS platform, or applications thereof). The analysis and validation engine performs automatic validation to determine if work items are implemented in a given application or platform. The relevant template could be in, for example, code, image, csv or other formats. In one or more embodiments, the analysis and validation engine 170 analyzes code at a location identified in a task data set. For example, in the operational example, the analysis and validation engine 170 analyzes the code at a Gitlab location obtained from TFS stories and validates if all the latest and current templates are applied.

The reporting engine 180 generates reports to provide users with an accurate view of the compliance of the data sets from the different task data sources 103-1 and 103-2. According to an embodiment, two types of reports are generated for users and transmitted to one or more user devices 102. A first type of report provides a user with the initial data set comparison and the extent to which the initial data set items match. For example, the first type of report provides a result of the comparing of the task data of the different task data sources and a number of the matching tasks. A second type of report provides a user with a view of the extent to which the common tasks are implemented in their product. For example, the second type of report indicates a number of the one or more matching tasks implemented in an application or platform corresponding to the first task data source 103-1 and/or an application or platform corresponding to the second task data source 103-2. The reports enable a user to take subsequent actions to reconcile their original data sources with discrepancies reported from the data set comparison stage, and also to perform necessary follow-up with product managers to ensure implementation of non-compliant work items. In the operational example, a report may depict that a developer made changes to an MQ TLS 1.2 enablement configuration and is 75% compliant with relevant changes. The developer can then address the open issues for 100% compliance.

Figure 6:
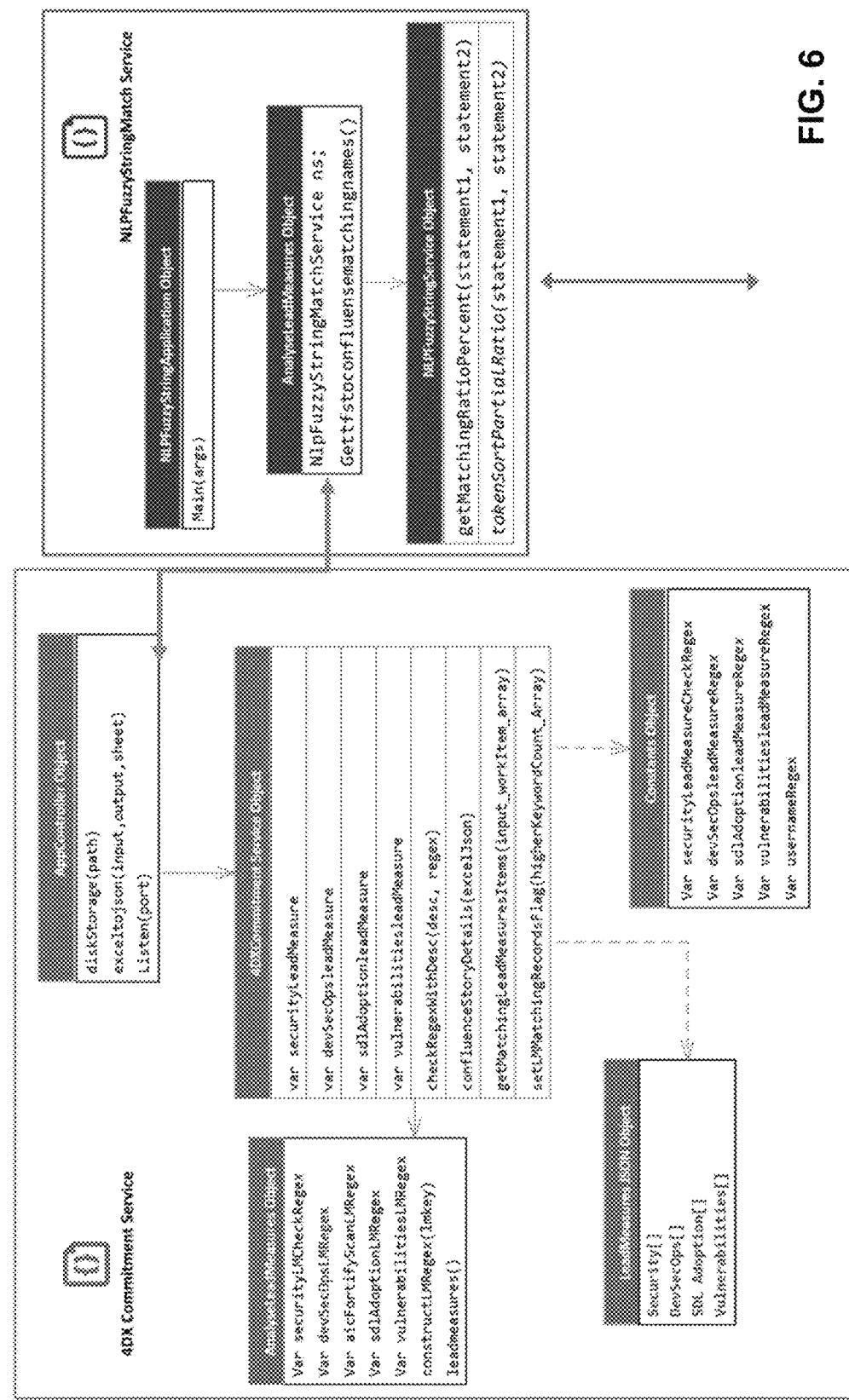
FIG. 6 depicts a class diagram of task correlation processing according to an illustrative embodiment.
Figure 6:
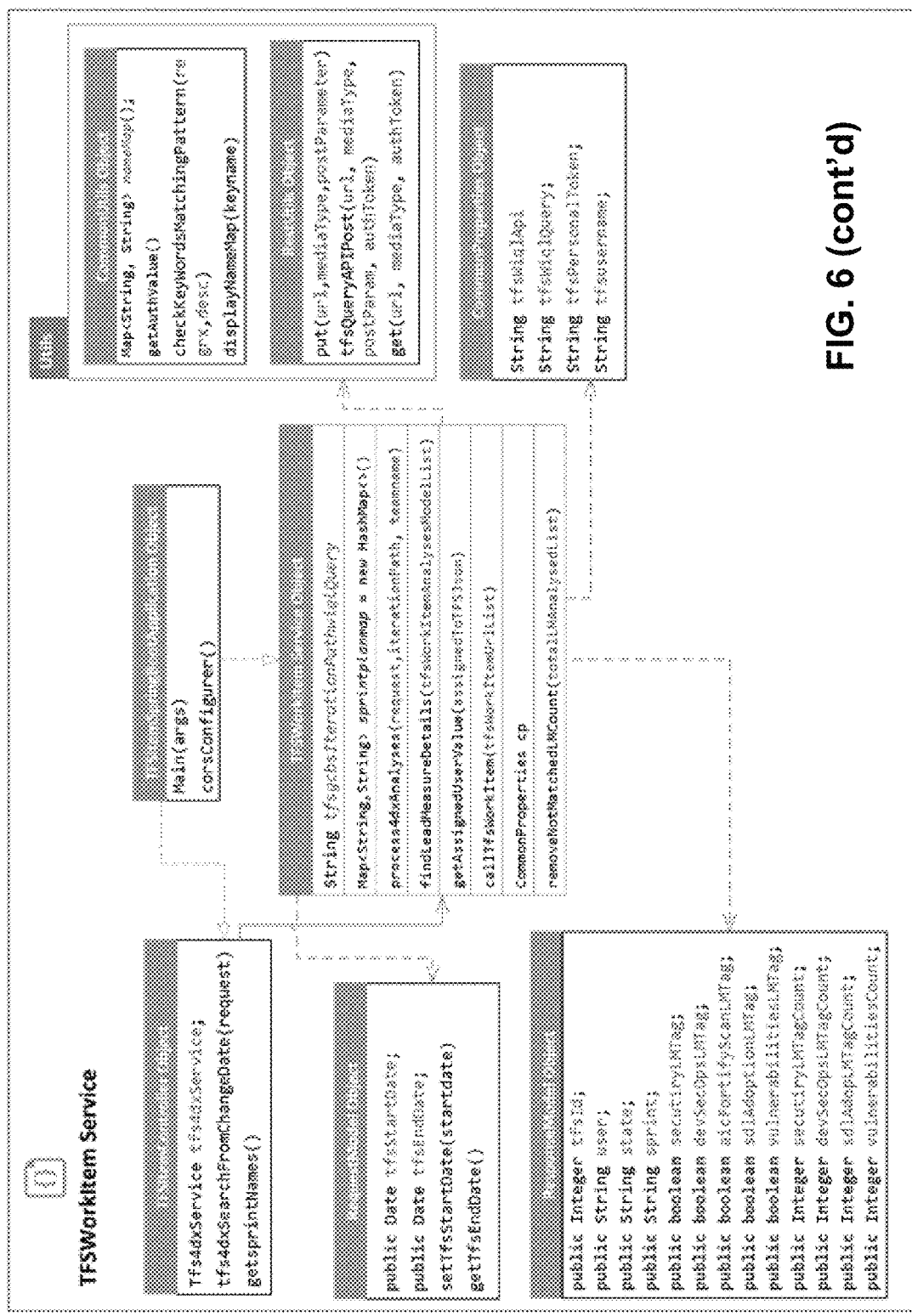

FIG. 6 depicts a class diagram 600 of task correlation processing. In an operational example, classes related to commitment (e.g., 4DX commitment), work item query (e.g., TFS work item query) and standardized flow are depicted. The diagram represents a general conceptual modeling of the structure of the embodiments, which translates into programming code.

Figure 7:
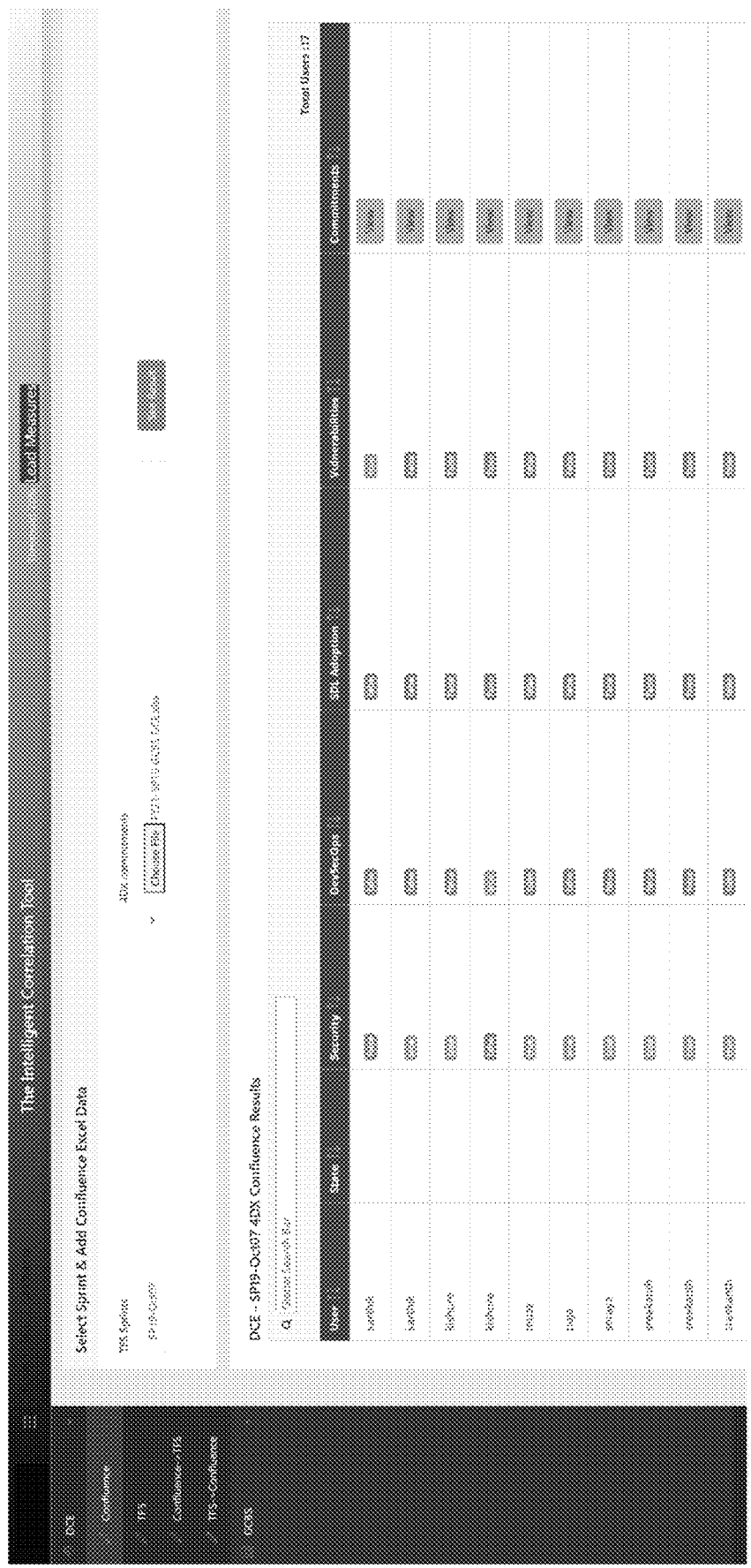
FIG. 7 depicts a user interface comprising extracted data from a first task data set according to an illustrative embodiment.

FIG. 7 depicts a user interface 700 comprising extracted data of a first task data set corresponding to a first platform (e.g., Confluence productivity platform). Referring to the user interface 700, a user selects as an input a TFS sprint (e.g., a sprint name as input "SP19-Oct07") and data is filtered using, for example, the data standardization engine 130 to find the relevant sprint data. In addition, based on an input of 4DX commitments, the user interface 700 displays a spreadsheet with team members (e.g., users) and their corresponding tasks. The spreadsheet can include fields such as, for example, user, commitments, state and sprint name. The keywords and/or tags applied by, for example, the keyword/tag search layer 131 may represent already configured 4DX statements of work or wildly important goals (WIGs). The keywords are illustrated on the user interface 700 as, for example, "Security," "DevSecOps," "SDL Adoption" and "Vulnerabilities."

Upon clicking of the "See Result" button in the user interface 700, user records of a particular sprint (e.g., "SP19-Oct07") from the 4DX commitments spreadsheet are retrieved. The result includes a list of user records mapped to a particular sprint. From the filtered records, analysis is performed on the "commitment" statements represented in the keywords. In addition, the noise removal layer 133 removes the noise so that user commitments mapped to corresponding 4DX statements of work/WIGs can be viewed. For example, in response to clicking on the "View" buttons for each user in the user interface 700, the respective user 4DX WIG commitments can be viewed.

Figure 8:
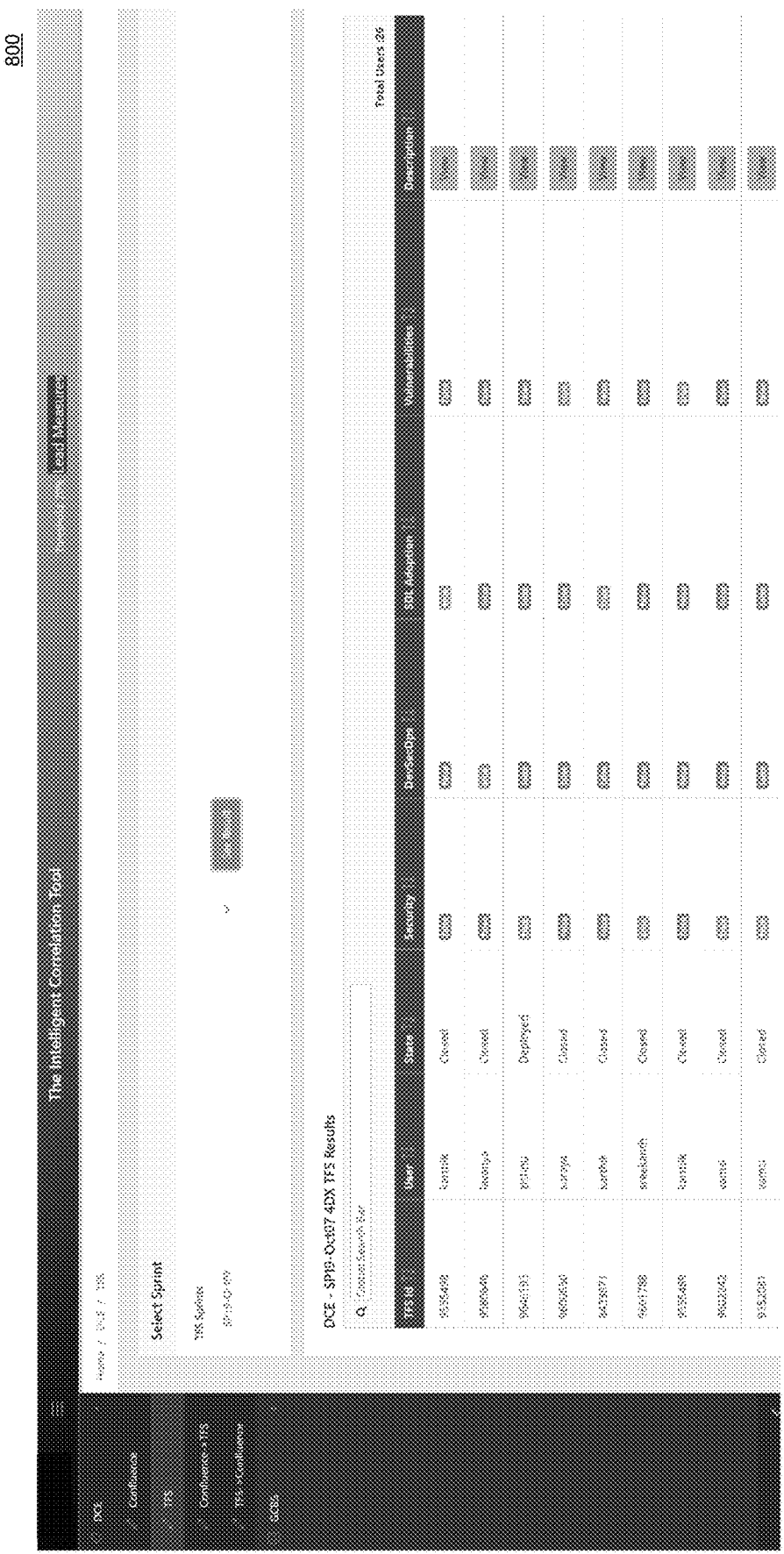
FIG. 8 depicts a user interface comprising extracted data from a second task data set according to an illustrative embodiment.

FIG. 8 depicts a user interface 800 comprising extracted data of a second task data set corresponding to a second platform (e.g., Microsoft TFS productivity platform). Referring to the user interface 800, a user selects as an input a TFS sprint (e.g., a sprint name as input "SP19-Oct07") and data is filtered using, for example, the data standardization engine 130 to find the relevant sprint data. Similar to the user interface 700, the keywords and/or tags applied by, for example, the keyword/tag search layer 131 may represent already configured 4DX statements of work or wildly important goals (WIGs). The keywords are illustrated on the user interface 800 as, for example, "Security," "DevSecOps," "SDL Adoption" and "Vulnerabilities."

Upon clicking of the "See Result" button in the user interface 800, a TFS backend API call is made by passing the sprint name (e.g., "SP19-Oct07") as input. The result includes a list of TFS records of each user in the team mapped to a particular sprint. From the filtered records, analysis is performed on the "task description" statements represented in the keywords. In addition, the noise removal layer 133 removes the noise so that user commitments mapped to corresponding TFS task descriptions can be viewed. For example, in response to clicking on the "View" buttons for each user in the user interface 800, the respective user TFS task descriptions can be viewed.

Figure 9:
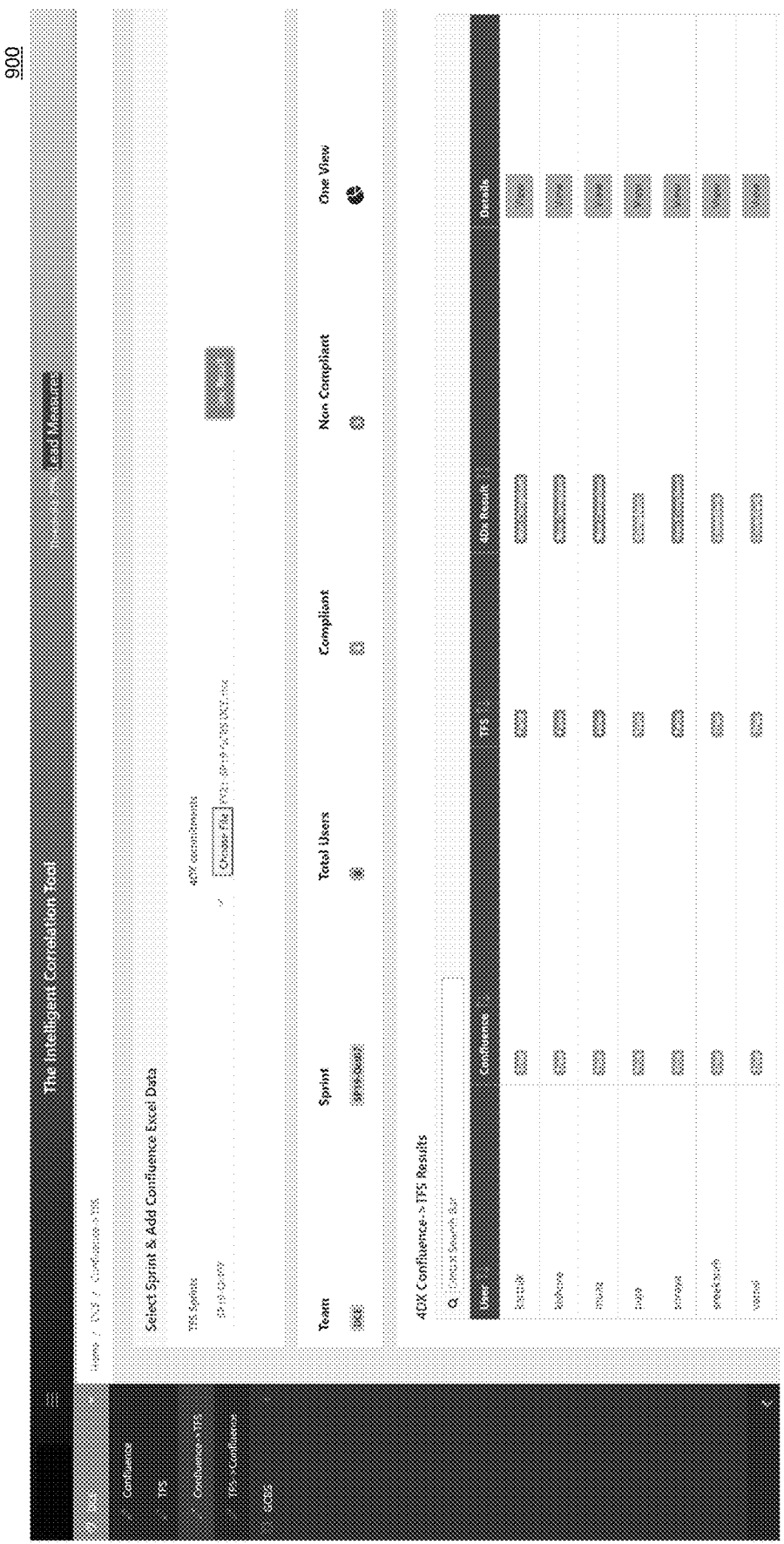
FIG. 9 depicts a user interface comprising results of a comparison between the two task data sets of FIGS. 7 and 8 according to an illustrative embodiment.

FIG. 9 depicts a user interface 900 comprising results of a comparison between the two task data sets of FIGS. 7 and 8. For example, after the successful validation of the task data sets from FIGS. 7 and 8, similar to the user interfaces 700 and 800, a user selects as an input a TFS sprint (e.g., a sprint name as input "SP19-Oct07") and data is filtered using, for example, the data standardization engine 130 to find the relevant sprint data. In addition, based on an input of 4DX commitments, a spreadsheet with team members (e.g., users) and their corresponding tasks may be generated. The spreadsheet can include fields such as, for example, user, commitments, state and sprint name.

Upon clicking of the "See Result" button in the user interface 900, data set filtration performed by, for example, the data standardization engine 130 occurs. The result includes a list of user records mapped to a particular sprint based on the sprint name (e.g., "SP19-Oct07") and to task description statements from the TFS platform matching with the 4DX statements of work/WIGs. In addition, using 4DX commitments from the spreadsheet, data is matched with user records mapped to the particular sprint and to commitments statements matching with the 4DX statements of work/WIGs.

The filtered data sets from the data standardization engine 130 are applied to the data comparison engine 140. After filtration, comparison between the data sets is performed using the ML and NLP layers 141 and 143. The result identifies one or more matching items corresponding to a data set associated with the TFS platform and another data set associated with the 4DX platform.

If both Confluence and TFS results are "True," both task data sets for a user match with common keywords/tags, and the task is marked as "Compliant." In an operational example for the "Compliant" scenario, in response to clicking on the "View" button in the user interface 900 for a given user, a message such as, for example, "User: puja: 'Security' tasks are correlated from both TFS and 4DX applications" is displayed. Alternatively, if any one of the results are false, then both task data sets for a user do not match with common keywords/tags, and the task is marked as "Non-Compliant." In an operational example for the "Non-Compliant" scenario, in response to clicking on the "View" button in the user interface 900 for a given user, a message such as, for example, "User: karthik: 'Security' tasks are not correlated between TFS and 4DX applications" is displayed. The user interface 900 further displays team level (e.g., DCE) overall "Complaint" and "Non-Compliant" results in one section for the quick understanding.

In one or more embodiments, the ML layer 141 of the data comparison engine 140 learns from collected data to make intelligent predictions and predictive measures. The data extraction engine 120 collects appropriate data from the task data sources 103-1 and 103-2 and, following standardization by the data standardization engine 130, passes the standardized data through machine learning algorithms in the ML layer 141 to predict what kind of preventive or remedial measures can be applied proactively to non-compliant tasks. This can be useful in activities like security adoption where the task correlation framework 110 would be able to predict the type of vulnerabilities that may surface and provide users with intelligent alerts to enable to them to address such situations proactively. In addition, one or more machine learning models of the ML layer 141 used in connection with the identifying of matching tasks are trained with actual matching tasks between task data from task data sources 103-1 and 103-2 to improve the accuracy of machine learning models used by the comparison engine 140 to determine the matching tasks.

According to one or more embodiments, databases, repositories or other data sources (e.g., task data sources 103-1 and 103-2 and code sources 105) used by the task correlation framework 110 can be configured according to a relational database management system (RDBMS) (e.g., PostgreSQL). Databases, repositories or other data sources in some embodiments are implemented using one or more storage systems or devices associated with the task correlation framework 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the task correlation framework 110, the data extraction engine 120, the data standardization engine 130, the data comparison engine 140, the template connection engine 160, the analysis and validation engine 170 and the reporting engine 180 in other embodiments can be implemented at least in part externally to the task correlation framework 110, for example, as stand-alone servers, sets of servers or other types of systems coupled to the network 104. For example, the data extraction engine 120, the data standardization engine 130, the data comparison engine 140, the template connection engine 160, the analysis and validation engine 170 and/or the reporting engine 180 may be provided as cloud services accessible by the task correlation framework 110.

The data extraction engine 120, the data standardization engine 130, the data comparison engine 140, the template connection engine 160, the analysis and validation engine 170 and the reporting engine 180 in the FIG. 1 embodiment are each assumed to be implemented using at least one processing device. Each such processing device generally comprises at least one processor and an associated memory, and implements one or more functional modules for controlling certain features of the data extraction engine 120, the data standardization engine 130, the data comparison engine 140, the template connection engine 160, the analysis and validation engine 170 and/or the reporting engine 180.

At least portions of the task correlation framework 110 and the components thereof may be implemented at least in part in the form of software that is stored in memory and executed by a processor. The task correlation framework 110 and the components thereof comprise further hardware and software required for running the task correlation framework 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data extraction engine 120, the data standardization engine 130, the data comparison engine 140, the template connection engine 160, the analysis and validation engine 170, the reporting engine 180 and other components of the task correlation framework 110 in the present embodiment are shown as part of the task correlation framework 110, at least a portion of the data extraction engine 120, the data standardization engine 130, the data comparison engine 140, the template connection engine 160, the analysis and validation engine 170, the reporting engine 180 and other components of the task correlation framework 110 in other embodiments may be implemented on one or more other processing platforms that are accessible to the task correlation framework 110 over one or more networks. Such components can each be implemented at least in part within another system element or at least in part utilizing one or more stand-alone components coupled to the network 104.

It is assumed that the task correlation framework 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data extraction engine 120, the data standardization engine 130, the data comparison engine 140, the template connection engine 160, the analysis and validation engine 170, the reporting engine 180 and other components of the task correlation framework 110, and the elements thereof can each be implemented in the form of one or more LXCs running on one or more VMs. Other arrangements of one or more processing devices of a processing platform can be used to implement the data extraction engine 120, the data standardization engine 130, the data comparison engine 140, the template connection engine 160, the analysis and validation engine 170 and the reporting engine 180, as well as other components of the task correlation framework 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the task correlation framework 110 to reside in different data centers. Numerous other distributed implementations of the task correlation framework 110 are possible.

Accordingly, one or each of the data extraction engine 120, the data standardization engine 130, the data comparison engine 140, the template connection engine 160, the analysis and validation engine 170, the reporting engine 180 and other components of the task correlation framework 110 can each be implemented in a distributed manner so as to comprise a plurality of distributed components implemented on respective ones of a plurality of compute nodes of the task correlation framework 110.

It is to be appreciated that these and other features of illustrative embodiments are presented by way of example only, and should not be construed as limiting in any way.

Accordingly, different numbers, types and arrangements of system components such as the data extraction engine 120, the data standardization engine 130, the data comparison engine 140, the template connection engine 160, the analysis and validation engine 170, the reporting engine 180 and other components of the task correlation framework 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the task correlation framework can be offered to cloud infrastructure customers or other users as part of FaaS, CaaS and/or PaaS offerings.

Figure 10:
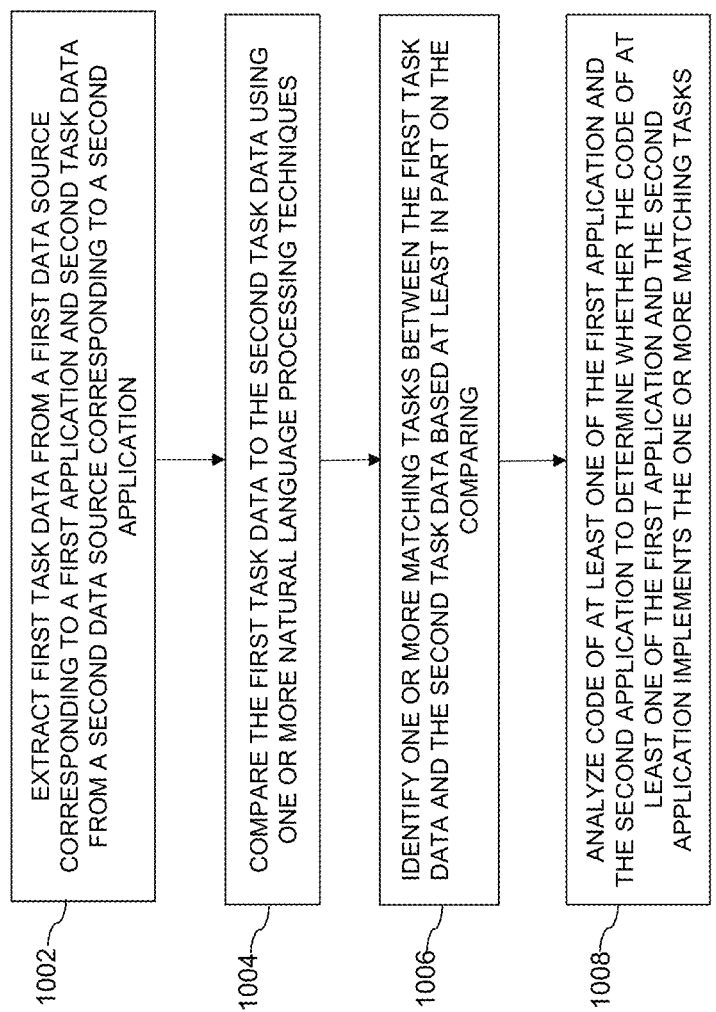
FIG. 10 depicts a process for analyzing tasks from different sources and determining matching tasks according to an illustrative embodiment.

The operation of the information processing system 100 will now be described in further detail with reference to the flow diagram of FIG. 10. With reference to FIG. 10, a process 1000 for analyzing incoming tasks and routing the tasks to resources as shown includes steps 1002 through 1008, and is suitable for use in the system 100 but is more generally applicable to other types of information processing systems comprising a task correlation framework configured for analyzing tasks from different sources and determining matching tasks.

In step 1002, first task data is extracted from a first data source corresponding to a first application and second task data is extracted from a second data source corresponding to a second application. In step 1004, the first task data is compared to the second task data using one or more natural language processing techniques. In one or more embodiments, the first task data and the second task data are in different formats from each other. Additionally, in accordance with illustrative embodiments, the first application and second application respectively correspond to first and second platforms, and the first and second platforms are different from each other.

In step 1006, one or more matching tasks between the first task data and the second task data are identified based at least in part on the comparing. Identifying the one or more matching tasks between the first task data and the second task data comprises computing a distance between at least two sets of textual data respectively corresponding to the first task data and the second task data. The computing is performed using a distance algorithm such as, for example, a Levenshtein distance algorithm.

In step 1008, code of at least one of the first application and the second application is analyzed to determine whether the code of at least one of the first application and the second application implements the one or more matching tasks.

The method further includes filtering at least one of the first and second task data based at least in part on one or more parameters, where the filtering is performed prior to the comparing of the first task data to the second task data. The one or more parameters comprise at least one of a keyword and a tag.

In some embodiments, one or more outlier tasks in at least one of the first task data and the second task data are identified based at least in part on the comparing of the first task data to the second task data. The one or more outlier tasks are determined to lack a matching task between the first task data and the second task data.

The method also includes extracting the code of at least one of the first application and the second application from a repository, wherein the code is formatted in one or more templates and the repository comprises a Git repository. The analyzing of the code to determine whether the code implements the one or more matching tasks comprises applying the one or more templates and analyzing a result of the applying of the one or more templates.

In illustrative embodiments, a report indicating a number of the one or more matching tasks implemented in at least one of the first application and the second application is generated, and the report is transmitted to at least one user device. Additionally or alternatively, a report of a result of the comparing of the first task data to the second task data and of a number of the one or more matching tasks is generated, and the report is transmitted to at least one user device.

In one or more embodiments, one or more machine learning models used in connection with the identifying of the one or more matching tasks are trained with actual matching tasks between the first task data and the second task data.

It is to be appreciated that the FIG. 10 process and other features and functionality described above can be adapted for use with other types of information systems configured to execute task correlation services in a task correlation framework or other type of platform.

The particular processing operations and other system functionality described in conjunction with the flow diagram of FIG. 10 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a task correlation framework as disclosed herein can provide a number of significant advantages relative to conventional arrangements. For example, unlike conventional techniques, the embodiments advantageously provide a framework for task (work item) correlation which intelligently correlates task data sets to maximize resource productivity, adhere to mandatory compliance goals and improve needed resource forecasting. The embodiments also intelligently generate and/or formulate tasks, and perform predictive analytics to forecast future patterns in resource planning as well as task generation. In one or more embodiments, tasks or subsets of tasks are extracted from an original task data set based on prescribed filters. The embodiments further use machine learning to analyze the results of task comparisons by performing analysis of inputted and outputted data collected over time.

Advantageously, unlike conventional approaches, the embodiments use NLP, NLU and machine learning techniques to correlate tasks from two or more differently configured data sets, as well as to generate or formulate new tasks. In order to measure compliance and progress toward achieving one or more goals, the embodiments further track in real time tasks proposed in different productivity platforms and analyze whether code or other configurations are implementing the proposed tasks. The embodiments determine the tasks to analyze by identifying matching tasks from different data sets corresponding to the different platforms and determine whether the code is implementing the matching tasks.

Currently, there is a lack of utilities to correlate tasks from differently configured platforms. The embodiments provide such a tool, which saves computing resources and reduces the time for delivery of completed tasks. The embodiments further provide for empirical tracking of tasks and comparisons across multiple task data sets, automated reporting of the tracking and/or comparisons, and techniques for adjusting a ranking of relevant information to be sent to users.

As an additional advantage, the embodiments generate reports on the differences between tasks amongst the data sets and suggest actions to users to undertake to meet the needs of data set compliance. In some embodiments, new task data sets are created. For example, the embodiments are capable of standardizing inputted tasks and formulating new tasks as per required standards. Moreover, the embodiments make intelligent comparisons across task datasets using distance algorithms and NLP and/or NLU, and provide machine learning capabilities to learn from comparison results and improve the match accuracy over time. The embodiments provide for automated implementation of the above functions, including extraction of tasks from different task data sources and filtering of unrelated tasks.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the task correlation framework 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a task correlation framework in illustrative embodiments. These and other cloud-based systems in illustrative embodiments can include object stores.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
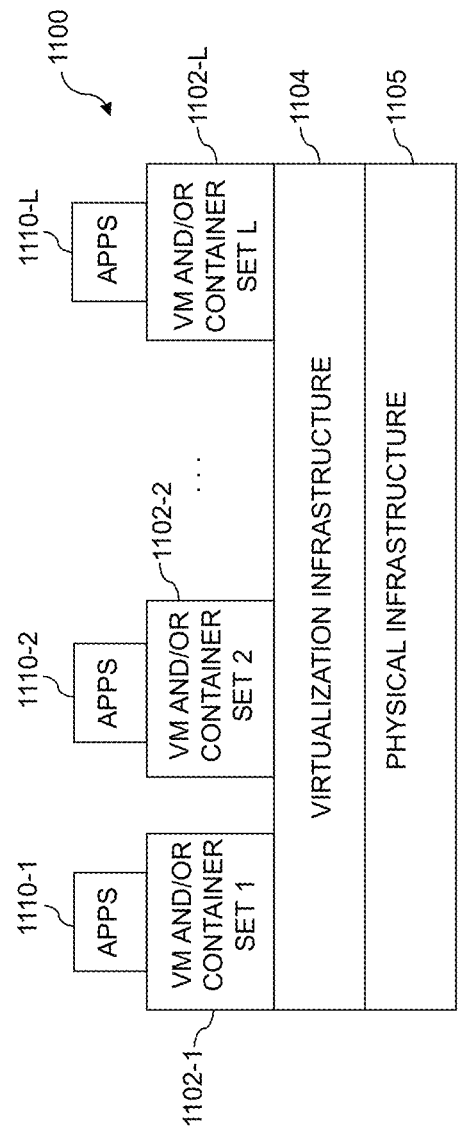
FIGS. 11 and 12 show examples of processing platforms that may be utilized to implement at least a portion of an information processing system according to illustrative embodiments.
Figure 12:
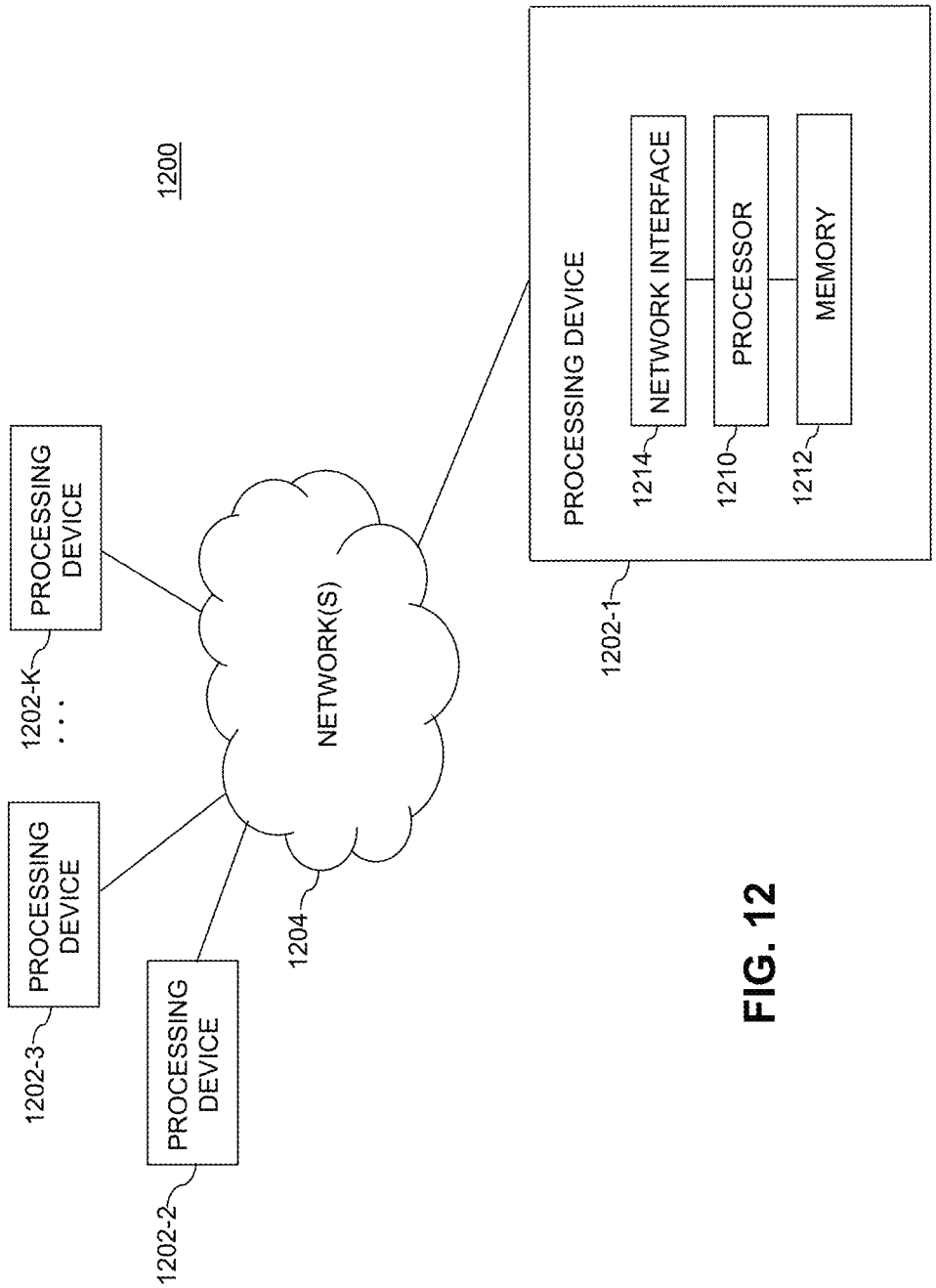

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the task correlation framework 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and task correlation frameworks. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    extracting first task data from a first data source corresponding to a first application and second task data from a second data source corresponding to a second application;
    comparing the first task data to the second task data using one or more natural language processing techniques;
        identifying one or more matching tasks between the first task data and the second task data based at least in part on the comparing, wherein identifying the one or more matching tasks between the first task data and the second task data comprises computing a value corresponding to a difference between at least two sets of textual data respectively corresponding to the first task data and the second task data;
        analyzing code of at least one of the first application and the second application to determine whether the code of at least one of the first application and the second application implements the one or more matching tasks; and
        filtering at least one of the first and second task data based at least in part on one or more parameters, where the filtering is performed prior to the comparing of the first task data to the second task data;
    wherein the steps of the method are executed by a processing device operatively coupled to a memory.

2. The method of claim 1 wherein the one or more parameters comprise at least one of a keyword and a tag.

3. The method of claim 1 wherein the value corresponding to the difference comprises a distance between the at least two sets of textual data respectively corresponding to the first task data and the second task data, wherein the computing is performed using a distance algorithm.

4. The method of claim 3 wherein the distance algorithm comprises a Levenshtein distance algorithm.

5. The method claim 1 wherein the first task data and the second task data are in different formats from each other.

6. The method of claim 5 wherein the first application and second application respectively correspond to first and second platforms, and the first and second platforms are different from each other.

7. The method of claim 1 further comprising identifying one or more outlier tasks in at least one of the first task data and the second task data based at least in part on the comparing, wherein the one or more outlier tasks are determined to lack a matching task between the first task data and the second task data.

8. The method of claim 1 further comprising extracting the code of at least one of the first application and the second application from a repository.

9. The method of claim 8 wherein the code is formatted in one or more templates and the repository comprises a Git repository.

10. The method of claim 9 wherein the analyzing of the code to determine whether the code implements the one or more matching tasks comprises applying the one or more templates and analyzing a result of the applying of the one or more templates.

11. The method of claim 1 further comprising:
    generating a report indicating a number of the one or more matching tasks implemented in at least one of the first application and the second application; and
    transmitting the report to at least one user device.

12. The method of claim 1 further comprising:
    generating a report of a result of the comparing of the first task data to the second task data and of a number of the one or more matching tasks; and
    transmitting the report to at least one user device.

13. The method of claim 1 further comprising training one or more machine learning models used in connection with the identifying of the one or more matching tasks with actual matching tasks between the first task data and the second task data.

14. An apparatus comprising:
a processing device operatively coupled to a memory and configured to:
extract first task data from a first data source corresponding to a first application and second task data from a second data source corresponding to a second application;
compare the first task data to the second task data using one or more natural language processing techniques;
identify one or more matching tasks between the first task data and the second task data based at least in part on the comparing, wherein, in identifying the one or more matching tasks between the first task data and the second task data, the processing device is configured to compute a value corresponding to a difference between at least two sets of textual data respectively corresponding to the first task data and the second task data;
analyze code of at least one of the first application and the second application to determine whether the code of at least one of the first application and the second application implements the one or more matching tasks; and
filter at least one of the first and second task data based at least in part on one or more parameters, where the filtering is performed prior to the comparing of the first task data to the second task data.

15. The apparatus of claim 14 wherein the processing device is further configured to extract the code of at least one of the first application and the second application from a repository.

16. The apparatus of claim 15 wherein the code is formatted in one or more templates.

17. The apparatus of claim 16 wherein in analyzing the code to determine whether the code implements the one or more matching tasks, the processing device is configured to apply the one or more templates and analyze a result of the applying of the one or more templates.

18. An article of manufacture comprising a non-transitory processor-readable storage medium having stored therein program code of one or more software programs, wherein the program code when executed by at least one processing device causes said at least one processing device to perform the steps of:
extracting first task data from a first data source corresponding to a first application and second task data from a second data source corresponding to a second application;
comparing the first task data to the second task data using one or more natural language processing techniques;
identifying one or more matching tasks between the first task data and the second task data based at least in part on the comparing, wherein, in identifying the one or more matching tasks between the first task data and the second task data, the program code causes said at least one processing device to compute a value corresponding to a difference between at least two sets of textual data respectively corresponding to the first task data and the second task data;
analyzing code of at least one of the first application and the second application to determine whether the code of at least one of the first application and the second application implements the one or more matching tasks; and
filtering at least one of the first and second task data based at least in part on one or more parameters, where the filtering is performed prior to the comparing of the first task data to the second task data.

19. The article of manufacture of claim 18 wherein:
the program code further causes said at least one processing device to perform the step of extracting the code of at least one of the first application and the second application from a repository, wherein the code is formatted in one or more templates; and
in analyzing the code to determine whether the code implements the one or more matching tasks, the program code causes said at least one processing device to perform the steps of applying the one or more templates and analyzing a result of the applying of the one or more templates.

20. The article of manufacture of claim 18 wherein the program code further causes said at least one processing device to perform the step of identifying one or more outlier tasks in at least one of the first task data and the second task data based at least in part on the comparing, wherein the one or more outlier tasks are determined to lack a matching task between the first task data and the second task data.

\* \* \* \* \*